United States Patent
Yin et al.

(10) Patent No.: US 7,289,543 B2
(45) Date of Patent: Oct. 30, 2007

(54) SYSTEM AND METHOD FOR TESTING THE OPERATION OF A DLL-BASED INTERFACE

(75) Inventors: Guangming Yin, Foothill Ranch, CA (US); Bo Zhang, Las Flores, CA (US)

(73) Assignee: Broadcom Corporation, Irvine, CA (US)

( * ) Notice: Subject to any disclaimer, the term of this patent is extended or adjusted under 35 U.S.C. 154(b) by 805 days.

(21) Appl. No.: 10/778,419

(22) Filed: Feb. 13, 2004

(65) Prior Publication Data

US 2004/0161070 A1    Aug. 19, 2004

Related U.S. Application Data

(63) Continuation-in-part of application No. 10/390,490, filed on Mar. 17, 2003, application No. 10/778,419, which is a continuation-in-part of application No. 10/445,771, filed on May 27, 2003.

(60) Provisional application No. 60/403,457, filed on Aug. 12, 2002, provisional application No. 60/401,708, filed on Aug. 6, 2002.

(51) Int. Cl.
*H04J 3/06* (2006.01)

(52) U.S. Cl. ............... 370/518; 370/535; 370/537; 375/371

(58) Field of Classification Search ............... 370/518, 370/537, 535, 536, 538, 542, 389, 358, 395.53; 375/371, 286; 713/500, 600
See application file for complete search history.

(56) References Cited

U.S. PATENT DOCUMENTS 7,082,546 B2 * 7/2006 Schoch ............. 713/500

* cited by examiner

*Primary Examiner*—Chi Pham
*Assistant Examiner*—Alexander O. Boakye
(74) *Attorney, Agent, or Firm*—Garlick Harrison & Markison; Robert A. McLauchlan, III

(57) ABSTRACT

A high-speed bit stream data conversion circuit receives a first bit stream(s) and recovers a clock signal from the first bit stream(s). The data conversion circuit then produces a second bit stream(s) having a second lower bit rate. A control loop adjusts the phase relationship of the recovered clock signal to the first bit stream(s) to minimize data loss when the first bit stream(s) is sliced to produce the second bit stream(s). A reference clock signal produced within a clock circuit is divided to produce a reduced frequency reference clock, which is multiplexed with a test clock signal to produce an output signal. Differentially dividing the output signal produces a series of input signals for an interpolator that selectively weighs and sums the input signals as directed by the control loop to produce the recovered clock signal with the desired phase relationship relative to the first bit stream(s).

20 Claims, 14 Drawing Sheets

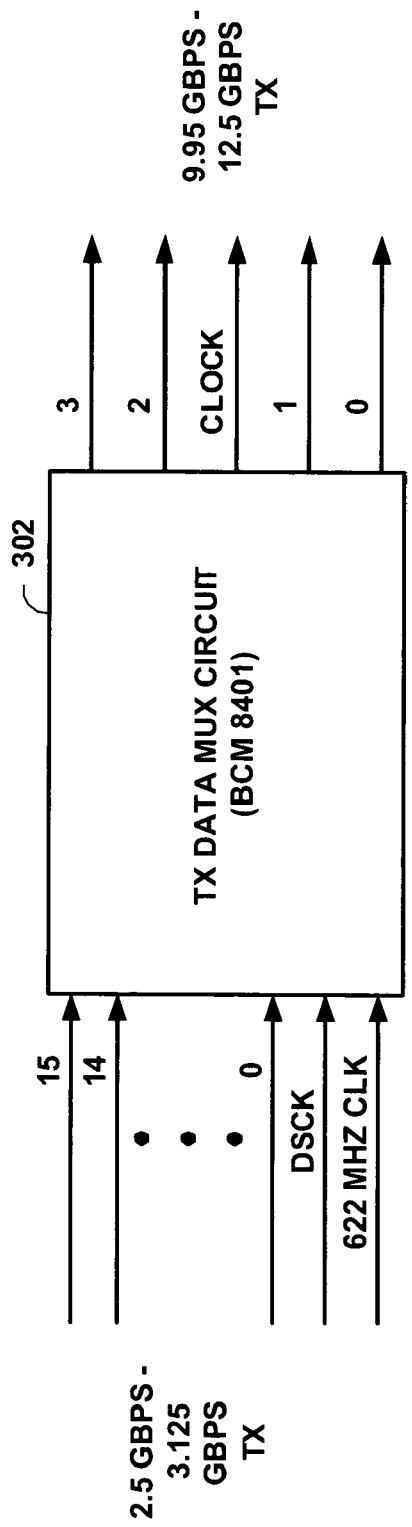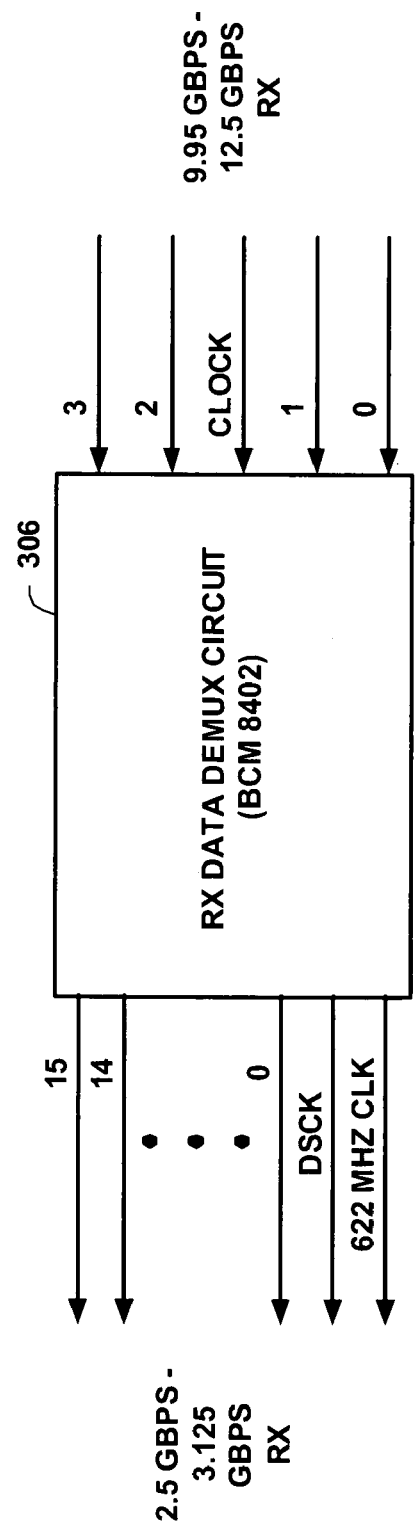
FIG. 4A
FIG. 4B

Receiver Input and Source Centered Clock Performance

| Parameter | Symbol | Conditions | Min | Typ | Max | Units |
|---|---|---|---|---|---|---|
| Output Common Mode | Vcm | See Figure Below | 1575 | 1675 | 1775 | mV |
| Single Ended Output Impedance | $Z_{SE}$ | | 40 | 50 | 60 | Ω |
| Differential Input impedance | $Z_d$ | | 80 | 100 | 120 | Ω |
| Input Impedance Mismatch | $Z_M$ | | | | 10 | % |
| Q40, CML Input Differential Amplitude, p-p | Δ VQDO | See Figure Below | 400 | 500 | 600 | mV |
| Q40 Input Rise and Fall Time (20% to 80%) | $t_{RH}, t_{FH}$ | | | 25 | 35 | ps |
| Differential output return loss* | S11 | Up to 7.5 GHz | 10 | | | dB |
| 4-by-1 mux input return loss >15 db at 10 GHz | | | | | | |

◀— 400

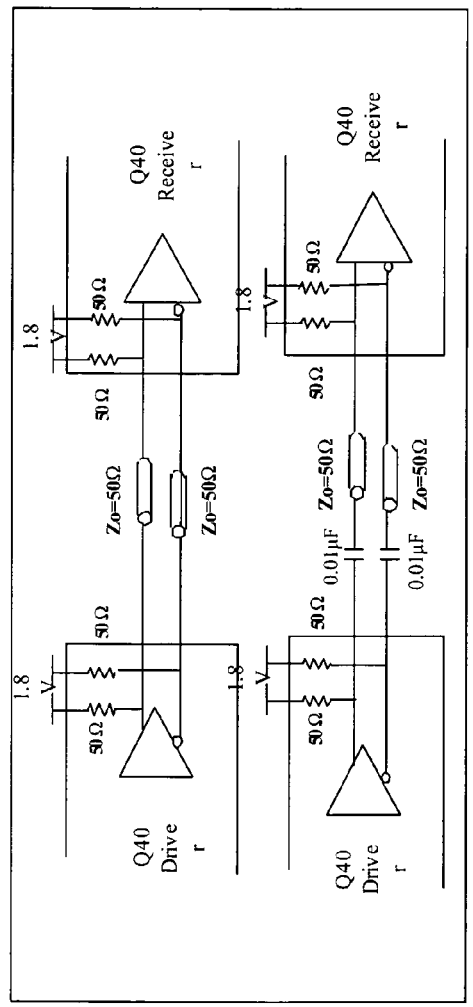

FIG. 6

SYSTEM AND METHOD FOR TESTING THE OPERATION OF A DLL-BASED INTERFACE

RELATED APPLICATIONS

This application is a continuation-in-part of U.S. patent application Ser. No. 10/390,490, entitled LOOP BACK TESTING STRUCTURE FOR HIGH-SPEED SERIAL BIT STREAM TX AND RX CHIP SET, and filed Mar. 17, 2003 which claims the benefit of U.S. Provisional Patent Application Ser. No. 60/401,708, filed Aug. 6, 2002, both of which are incorporated herein by reference in their entirety for all purposes. This application is also a continuation-in-part of U.S. patent application Ser. No. 10/445,771, filed May 27, 2003 which claims the benefit of U.S. Provisional Patent Application Ser. No. 60/403,457, filed Aug. 12, 2002, both of which are incorporated herein by reference in their entirety for all purposes.

TECHNICAL FIELD OF THE INVENTION

The present invention relates generally to communication systems; and more particularly to a system and method of tuning output drivers within a high-speed serial bit stream communications.

DESCRIPTION OF RELATED ART

The structure and operation of communication systems is generally well known. Communication systems support the transfer of information from one location to another location. Early examples of communication systems included the telegraph and the public switch telephone network (PSTN). When initially constructed, the PSTN was a circuit switched network that supported only analog voice communications. As the PSTN advanced in its structure and operation, it supported digital communications. The Internet is a more recently developed communication system that supports digital communications. As contrasted to the PSTN, the Internet is a packet switch network.

The Internet consists of a plurality of switch hubs and digital communication lines that interconnect the switch hubs. Many of the digital communication lines of the Internet are serviced via fiber optic cables (media). Fiber optic media supports high-speed communications and provides substantial bandwidth, as compared to copper media. At the switch hubs, switching equipment is used to switch data communications between digital communication lines. WANs, Internet service providers (ISPs), and various other networks access the Internet at these switch hubs. This structure is not unique to the Internet, however. Portions of the PSTN, wireless cellular network infrastructure, Wide Area Networks (WANs), and other communication systems also employ this same structure.

The switch hubs employ switches to route incoming traffic and outgoing traffic. A typical switch located at a switch hub includes a housing having a plurality of slots that are designed to receive Printed Circuit Boards (PCBs) upon which integrated circuits and various media connectors are mounted. The PCBs removably mount within the racks of the housing and typically communicate with one another via a back plane of the housing. Each PCB typically includes at least two media connectors that couple the PCB to a pair of optical cables and/or copper media. The optical and/or copper media serves to couple the PCB to other PCBs located in the same geographic area or to other PCBs located at another geographic area.

For example, a switch that services a building in a large city couples via fiber media to switches mounted in other buildings within the city and switches located in other cities and even in other countries. Typically, Application Specific Integrated Circuits (ASICs) are mounted upon the PCBs of the housing. These ASICs perform switching operations for the data that is received on the coupled media and transmitted on the coupled media. The coupled media typically terminates in a receptacle and transceiving circuitry coupled thereto performs signal conversion operations. In most installations, the media, e.g., optical media, operates in a simplex fashion. In such case, one optical media carries incoming data (RX data) to the PCB while another optical media carries outgoing data (TX data) from the PCB. Thus, the transceiving circuitry typically includes incoming circuitry and outgoing circuitry, each of which couples to a media connector on a first side and communicatively couples to the ASIC on a second side. The ASIC may also couple to a back plane interface that allows the ASIC to communicate with other ASICs located in the enclosure via a back plane connection. The ASIC is designed and implemented to provide desired switching operations. The operation of such enclosures and the PCBs mounted therein is generally known.

The conversion of information from the optical media or copper media to a signal that may be received by the ASIC and vice versa requires satisfaction of a number of requirements. First, the coupled physical media has particular RX signal requirements and TX signal requirements. These requirements must be met at the boundary of the connector to the physical media. Further, the ASIC has its own unique RX and TX signal requirements. These requirements must be met at the ASIC interface. Thus, the transceiving circuit that resides between the physical media and the ASIC must satisfy all of these requirements.

Various standardized interfaces have been employed to couple the transceiving circuit to the ASIC. These standardized interfaces include the XAUI interface, the Xenpak interface, the GBIC interface, the XGMII interface, and the SFI-5 interface, among others. The SFI-5 interface, for example, includes 16 data lines, each of which supports a serial bit stream having a nominal bit rate of 2.5 Giga bits-per-second (GBPS). Line interfaces also have their own operational characteristics. Particular high-speed line interfaces are the OC-768 interface and the SEL-768 interface. Each of these interfaces provides a high-speed serial interface operating at a nominal bit rate of 40 GBPS.

Particular difficulties arise in converting data between the 40×1 GBPS line interface and the 16×2.5 GBPS communication ASIC interface. In particular, operation on the 40 GBPS side is particularly susceptible to noise and requires the ability to switch data at a very high bit rate, e.g., exceeding the bit rate possible with a CMOS integrated circuit formed of Silicon. While other materials, e.g., Indium-Phosphate and Silicon-Germanium provide higher switching rates than do Silicon based devices, they are very expensive and difficult to manufacture. Further, the functional requirements of interfacing the 40×1 GBPS line interface and the 16×2.5 GBPS communication ASIC interface are substantial. Thus, if a device were manufactured that could perform such interfacing operations; the effective yield in an Indium-Phosphate or Silicon-Germanium process would be very low.

The phase relationship between the clock signal and the data signal is extremely important. Not only must the circuits produce a stable clock signal, but the clock signal must also be properly aligned to the sample point of the data signal to minimize data error. The operating frequency and phase of this clock signal must match the individual data signals in complex high-speed serial bit stream communications. Otherwise the integrity of the data can be adversely impacted. Delay Lock Loops (DLL) may be used to manipulate the phase relationship between the clock and data signals. Thus a need exists for an efficient way of ensuring the proper operation of these circuit elements.

BRIEF SUMMARY OF THE INVENTION

The present invention provides a method of controlling clock data phase relationship in a high-speed conversion circuit. To achieve this, a data signal is received at the data conversion circuit. Then a high-speed clock is recovered from the data signal, wherein the high-speed clock has a $1^{st}$ clock rate. Multiple-phase input clock signals having a $2^{nd}$ clock rate are received at an interpolator. The interpolator functions in either a normal mode of operation or a testing mode of operation. In the testing mode of operation the $1^{st}$ clock rate and $2^{nd}$ clock rate differ. The interpolator rotates the phase of the multiple-phase input clock signals to produce multiple-phase output clock signals at the $1^{st}$ clock rate, wherein the multiple-phase output clock signals input into the slicer. A phase difference between the data signal and the multiple-phase output clock signals at the slicer is sensed and used to generate a phase difference that is used to adjust the multiple-phase output clock signals. This allows the data signal to be sliced with the multiple-phase output clock signal at approximately midway between the crossing points of the multiple-phase output clock signals.

In another embodiment, this disclosure teaches that the proper operation of the interpolator may be tested. This testing is achieved as described above wherein the testing mode requires that the $1^{st}$ clock rate and $2^{nd}$ clock rate differ. No testing of the proper operation of the interpolator occurs when the $1^{st}$ clock rate and $2^{nd}$ clock rate do not differ.

Other features and advantages of the present invention will become apparent from the following detailed description of the invention made with reference to the accompanying drawings.

BRIEF DESCRIPTION OF THE SEVERAL VIEWS OF THE DRAWINGS

These and other features, aspects and advantages of the present invention will be more fully understood when considered with respect to the following detailed description, appended claims and accompanying drawings wherein:

FIG. 4A is a block diagram illustrating a TX data multiplexer circuit constructed according to the present invention;

FIG. 4B is a block diagram illustrating an RX data demultiplexer circuit constructed according to the present invention;

FIG. 6 is a table and a diagram that illustrate operating specifications for the RX interface between the RX data demultiplexer circuits of FIG. 3;

DETAILED DESCRIPTION OF THE INVENTION

Figure 1:
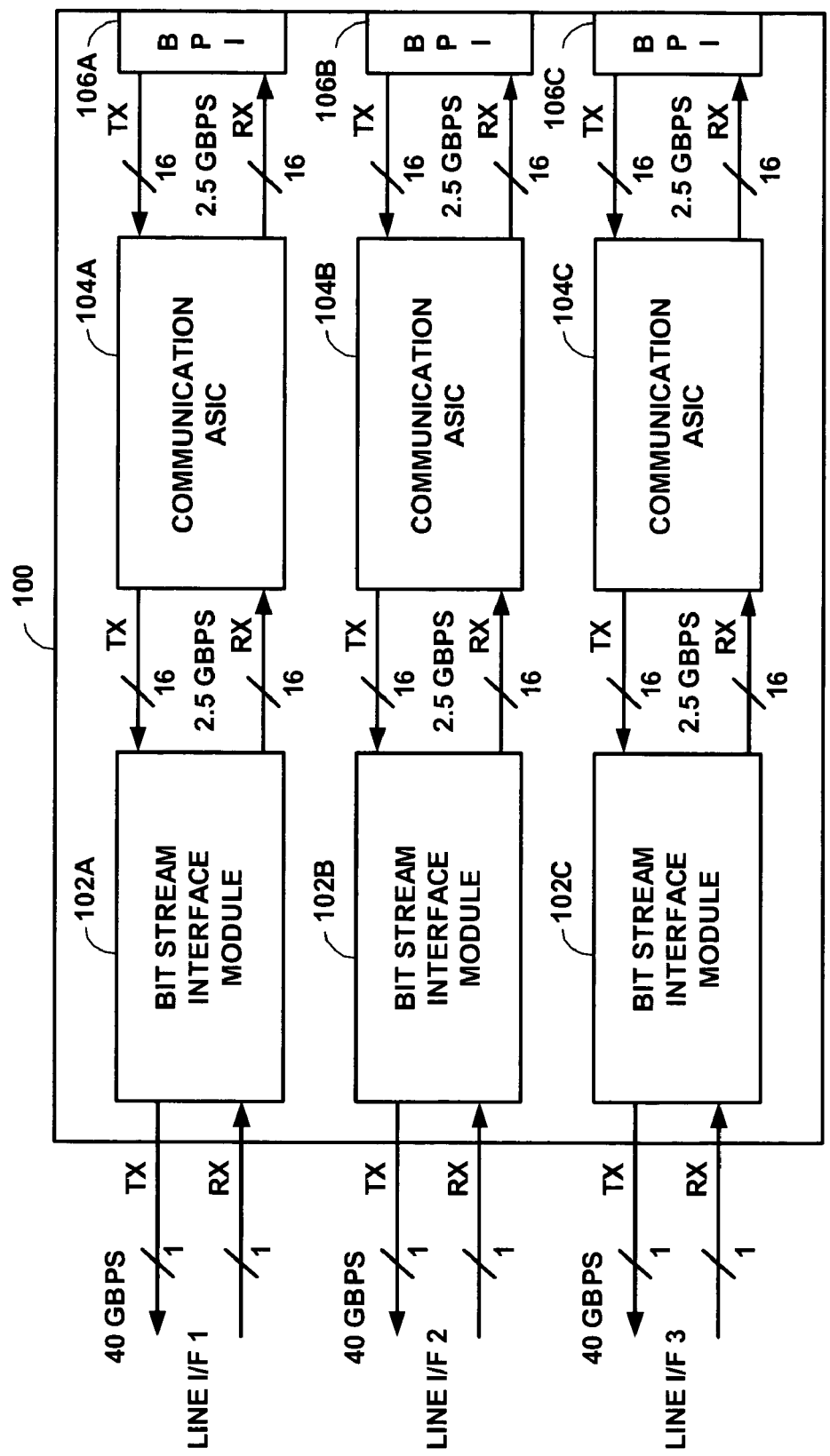
FIG. 1 is a block diagram illustrating a Printed Circuit Board (PCB) that has mounted thereon a plurality of Bit Stream Interface Module (BSIMs) constructed according to the present invention.

FIG. 1 illustrates with a block diagram a Printed Circuit Board (PCB) that has mounted thereon a number of Bit Stream Interface Module (BSIMS) constructed according to the present invention. As shown in FIG. 1, PCB 100 includes BSIMs 102A, 102B and 102C. PCB 100 also includes mounted thereupon communication Application Specific Integrated Circuits (ASIC) 104A, 104B, and 104C. PCB 100 mounts within a housing that services switching requirements within a particular location or geographic area. Each of the BSIMs 102A, 102B, and 102C couples to a high-speed media such as an optical fiber via a respective media interface and supports the OC-768 or the SEC-768 standard at such media interface. On the second side of the BSIMs 102A through 102C, the SFI-5 interface standard is supported. Communication ASIC 104A through 104C may communicate with other PCB components located in the housing via back interfaces 106A through 106C.

BSIMs 102A through 102C may be removably mounted upon PCB 100. In such case, if one of the BSIMs 102A through 102C fails it may be removed and replaced without disrupting operation of other devices on PCB 100. When BSIMs 102-102C are removably mounted upon PCB 100 and received by a socket or connection coupled to PCB 100. Further, in such embodiment, BSIMs 102A-102C may be constructed on a separate PCB.

Figure 2A:
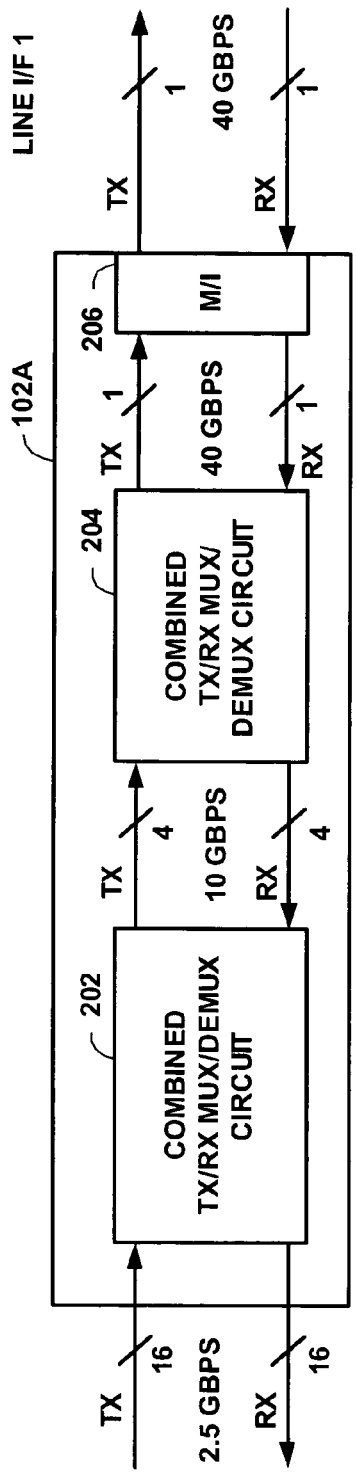
FIG. 2A is a block diagram illustrating one embodiment of a BSIM constructed according to the present invention.

FIG. 2A illustrates one embodiment of BSIM 102A. BSIM 102A of FIG. 2A includes a first combined TX/RX multiplexer/demultiplexer circuit 202 and a second combined TX/RX multiplexer/demultiplexer circuit 204. On the line side of BSIM 102A, first combined TX/RX multiplexer/demultiplexer circuit 202 couples to a media, e.g., fiber optic cable or copper cable, via a media interface 206. Media interface 206 couples to combined TX/RX multiplexer/demultiplexer circuit 204 via a 40 GPS nominal bit rate, one bit transmit and one bit receive interface. TX and RX line medias themselves each support one bit 40 Giga bits-per-second (GBPS) nominal bit rate communications, such as is defined by the OC-768 and/or SEC 768 specifications of the OIF.

Combined TX/RX multiplexer/demultiplexer circuit 202 interfaces with a communication ASIC, e.g. 104A, via 16 TX bit lines and 16 RX bit lines, each operating at a nominal bit rate of 2.5 GBPS. Such interface supports a nominal total throughput of 40 GBPS (16*2.5 GBPS). The interface between combined TX/RX multiplexer/demultiplexer circuit 202 and combined TX/RX multiplexer/demultiplexer circuit 204 includes 4 TX bit lines and 4 RX bit lines, each operating at a nominal rate of 10 GBPS. This interface supports a nominal total throughput of 40 GBPS (4*10 GBPS). This interface may operate substantially or fully in accordance with an operating standard known as the Q40 operating standard. However, the teachings of the present invention are not limited to according to operation of the Q40 standard or is the description here intended to be a complete description of the Q40 standard itself.

Figure 2B:
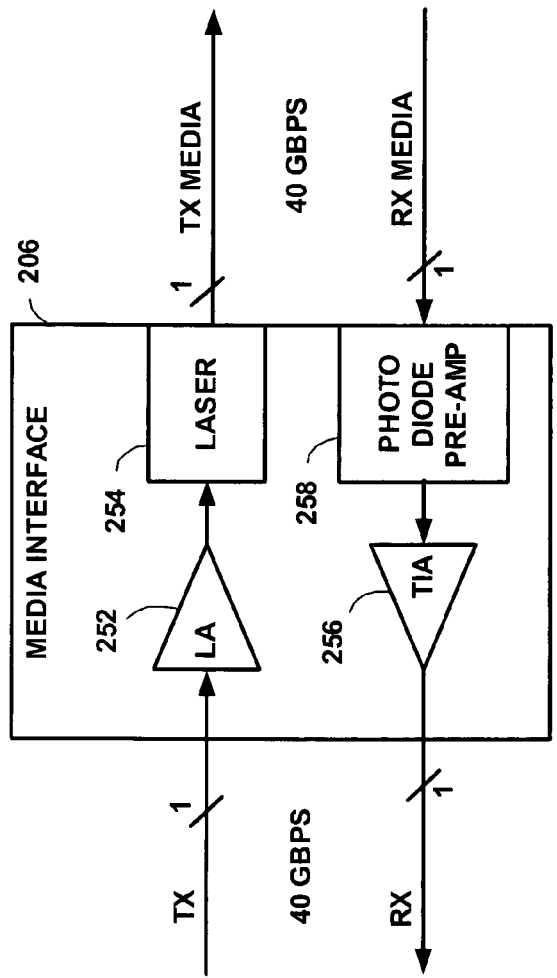
FIG. 2B is a block diagram illustrating an optical media interface that may be included with the BSIM of FIG. 2A.

FIG. 2B provides a block diagram illustrating an optical media interface that may be included with the BSIM of FIG. 2A. As shown in FIG. 2B, media interface 206 couples to an optical media on a first side and couples to the combined TX/RX multiplexer/demultiplexer circuit 204 on a second side. In the transmit path, media interface 206 receives a single bit stream at a nominal bit rate of 40 GBPS from combined TX/RX multiplexer/demultiplexer circuit 204. Limiting amplifier 252 amplifies the TX bit stream to produce a bit stream output coupled to laser 254. The laser produces an optical signal that is coupled to TX optical media.

On the receive side, an RX optical media produces the RX bit stream at a nominal bit rate of 40 GBPS. Photo diode/pre-amplifier combination 258 receives the RX bit stream and produces an output for transimpedance amplifier 256. Transimpedance amplifier 256 then outputs a single bit stream at a nominal bit rate of 40 GBPS for combined TX/RX multiplexer/demultiplexer circuit 204 of FIG. 2A.

Figure 3:
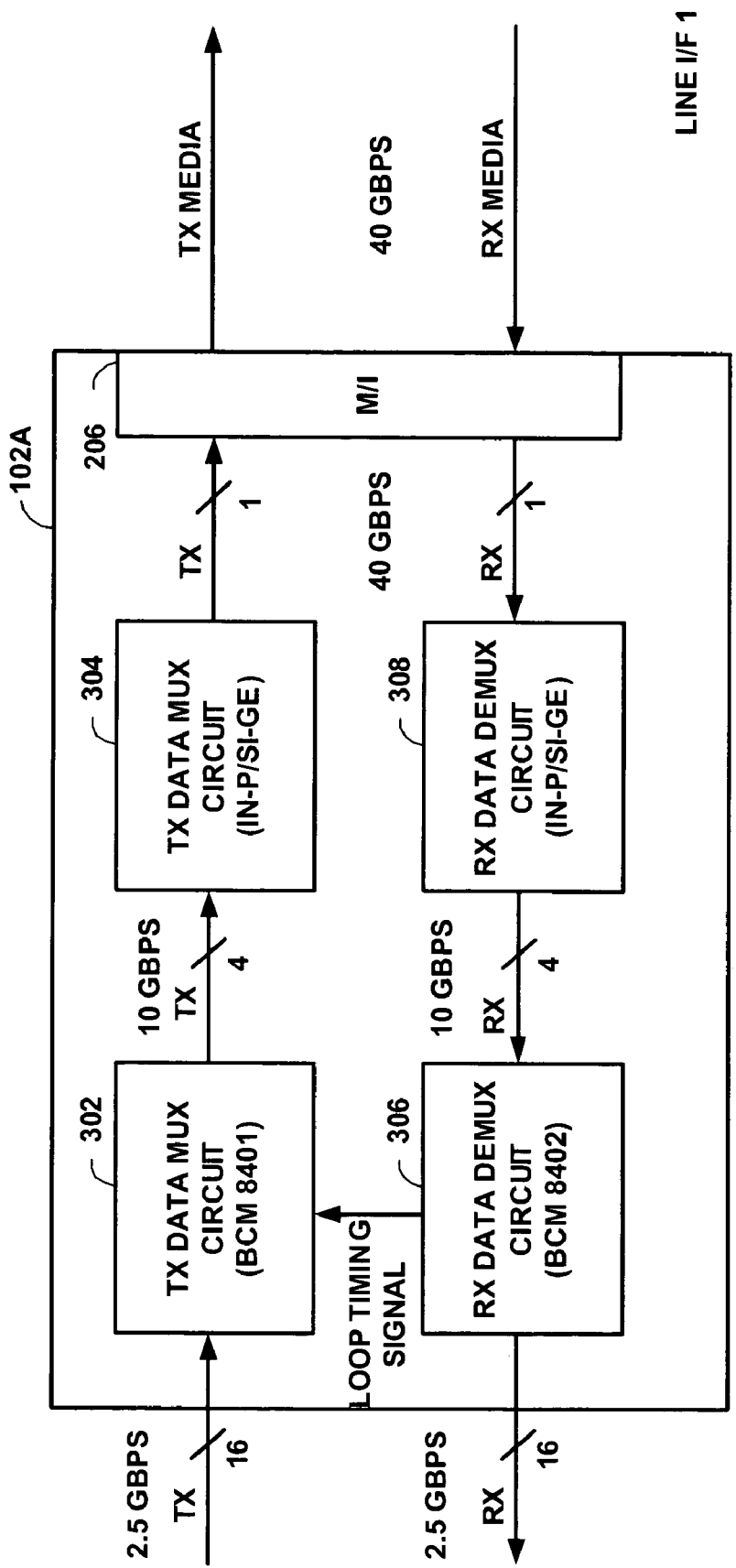
FIG. 3 is a block diagram illustrating another embodiment of a BSIM constructed according to the present invention.

FIG. 3 illustrates that separate TX and RX circuit components maybe employed. While media interface 206 of FIG. 3 is shown to be a single device such as shown in FIG. 2B, in other embodiments, the media interface 206 may be formed in separate circuits corresponding to separate TX and RX paths shown in FIG. 2B.

In the TX path, TX data multiplexer circuit 302 receives a 16 bit wide by 2.5 GBPS nominal bit rate input from a coupled ASIC and produces a 4 bit wide×10 GBPS nominal bit rate TX output. In the embodiment described herein, TX data multiplexer circuit 302 is constructed in a Silicon CMOS process, for example in a 0.13 micron CMOS process. The TX data multiplexer circuit 302 multiplexes the 16 bit wide by 2.5 GBPS nominal bit rate input to produce a 4 bit wide 10 GBPS nominal bit rate output, which is received by the TX data multiplexer circuit 304. TX data multiplexer circuit 304 multiplexes the 4 bit wide×10 GBPS nominal bit rate output to produce a single bit wide output at a nominal bit rate of 40 GBPS.

TX data multiplexer circuit 304 must switch at a frequency that is at least four times the rate at which TX data multiplexer circuit 302 must switch. For this reason, TX data multiplexer circuit 304 is constructed in an Indium-Phosphate, Silicon-Germanium Germanium or other like process that supports these required higher switching rates at the 40 GBPS output of TX data multiplexer circuit 304. The combination of TX data multiplexer circuit 302 constructed in a CMOS process and TX data multiplexer circuit 304 constructed in an Indium-Phosphate, Silicon-Germanium or other like process provides a high performance, relatively low cost solution with which to interface a 2.5 GBPS nominal bit rate 16 bit wide interface and a 40 GBPS 1 bit wide interface.

Likewise, in the RX path, bit stream interface module 102A includes an RX data demultiplexer circuit 308 that receives a single bit stream at a nominal bit rate of 40 GBPS data. RX data demultiplexer circuit 308 produces a 4 bit wide×10 GBPS nominal bit rate output for RX data demultiplexer circuit 306. In turn, RX data demultiplexer circuit 306 produces a 16 bit wide×2.5 GBPS nominal bit rate receive data stream.

As was the case with TX data multiplexer circuit 302 and TX data multiplexer circuit 304, RX data demultiplexer circuit 306 and RX data demultiplexer circuit 308 are formed in differing process types. In particular RX data demultiplexer circuit 306 is constructed in a Silicon CMOS or other like process that supports the relatively low switching rates. Further, RX data demultiplexer circuit 308 is constructed in an Indium-Phosphate, Silicon-Germanium, or other like process that supports the higher switching speeds.

FIG. 4A depicts a block diagram that illustrates a TX data multiplexer circuit. As shown in FIG. 4A, TX data multiplexer circuit 302 receives 16 bit steams of data at nominal bit rate of 2.5 GBPS on each bit line from the communication ASIC 104A. Each bit line of this 16 bit wide interface operates at bit rates of up to 3.125 GBPS. This interface also includes a DSCK clock and 622 MHz clock. The output of the TX data multiplexer circuit 302 includes 4 bit lines, each of which supports a nominal bit rate of 10 GBPS. However, the output of the TX data multiplexer circuit can produce data at bit rates between about 9.95 GBPS and 12.5 GBPS. TX data multiplexer circuit 302 also produces a clock signal at one-half the nominal bit rate of the 4 bit stream paths. In such case, when the nominal bit rate of the data paths is 10 GBPS, the clock will be produced at 5 GHz.

FIG. 4B is a functional block diagram illustrating RX data demultiplexer circuit 306. As shown, RX data demultiplexer circuit 306 receives 4 bit streams at nominal bit rates of 10 GBPS each but operates between about 9.95 GBPS and 12.5 GBPS. RX data demultiplexer circuit 306 produces 16 bit stream outputs at a nominal bit rate of 2.5 GBPS. However, RX data demultiplexer circuit 306 may produce 16 bit streams output at a bit rate between about 2.25 GBPS and 3.125 GBPS.

Figure 5:
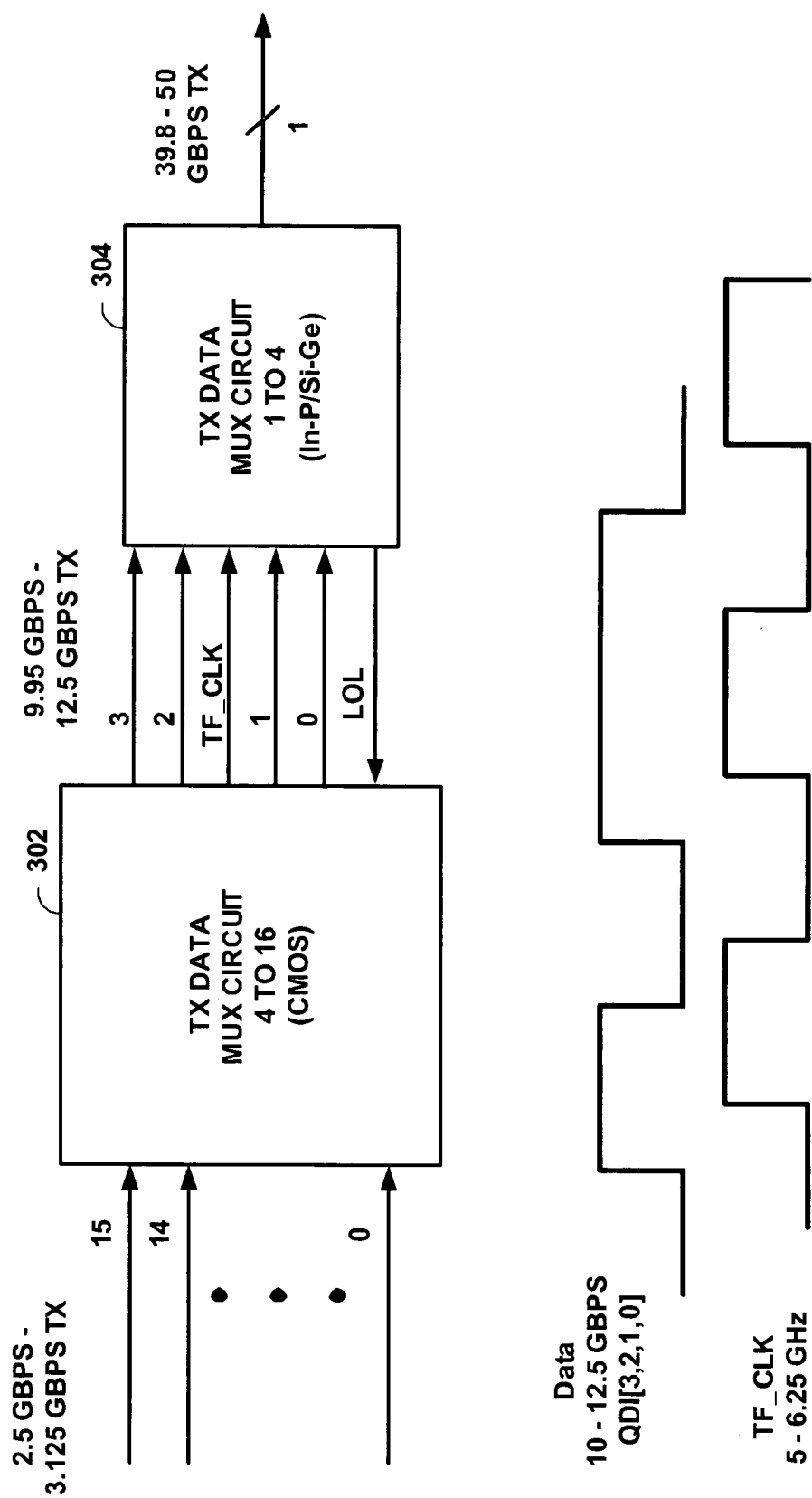
FIG. 5 is a block diagram illustrating the RX data demultiplexer circuits of FIG. 3 and the interfaces serviced thereby.

FIG. 5 is a block diagram depicting RX data demultiplexer circuit 306 coupled with RX data demultiplexer circuit 308 of FIG. 3 and the interfaces serviced thereby. As is shown in FIG. 5, RX data demultiplexer circuit 308 receives a single bit stream at a nominal bit rate of 40 GBPS. However, the single bit stream input may operate at bit rates between about 39.8 GBPS and 50 GBPS. Each RX data demultiplexer circuit performs a 1 to 4 demultiplexing operation on the received single bit stream to produce 4 output bit streams for each input bit stream. RX data demultiplexer circuit 308 produces output at bit rates between about 9.95 GBPS and 12.5 GBPS.

RX data demultiplexer circuit 306 receives 4 bit streams having nominal bit rates of 10 GBPS each, a QCLKI signal, and a RX_LOL signal from RX data demultiplexer circuit 308. Based upon these input signals, RX data demultiplexer circuit 306 produces 16 bit stream outputs at nominal bit rates of 2.5 GBPS. Also shown in FIG. 5, the QCLKI signal operates at one-half the frequency of the bit rate of the data stream received from RX data demultiplexer circuit 308. Thus, in such case, for the nominal bit rate of 10 GBPS, the QCLKI signal will be provided at 5 GHz.

Skewing often occurs because the clock and data are both generated externally to RX data demultiplexer circuit 306, and because the data and clock signals must travel over PC board traces that likely will have varying lengths and therefore varying parasitic loads. Skewing occurs between the clock QCLKI and data the 4 bit streams generated by circuit 308. Given the high speed at which these inputs operate, there is very little room for delay caused by mismatches between the clock and data signals. Without a signal delay method, the clock data relationship cannot be guaranteed to comport with the specifications established for that relationship. Further, because each of the data paths is unique across the PCB, it is highly likely that, even though the RX data demultiplexer circuit 308 produces data that is aligned upon transmission, the data will not be aligned upon receipt by the RX data demultiplexer circuit 306.

FIG. 6 includes a table and a diagram that illustrate operating specifications for the RX interface between the RX data demultiplexer circuits 308 and 306 of FIG. 3. As shown in FIG. 6, the receiver input parameters are shown at 400 and an equivalent circuit thereupon is shown at 402.

Figure 7:
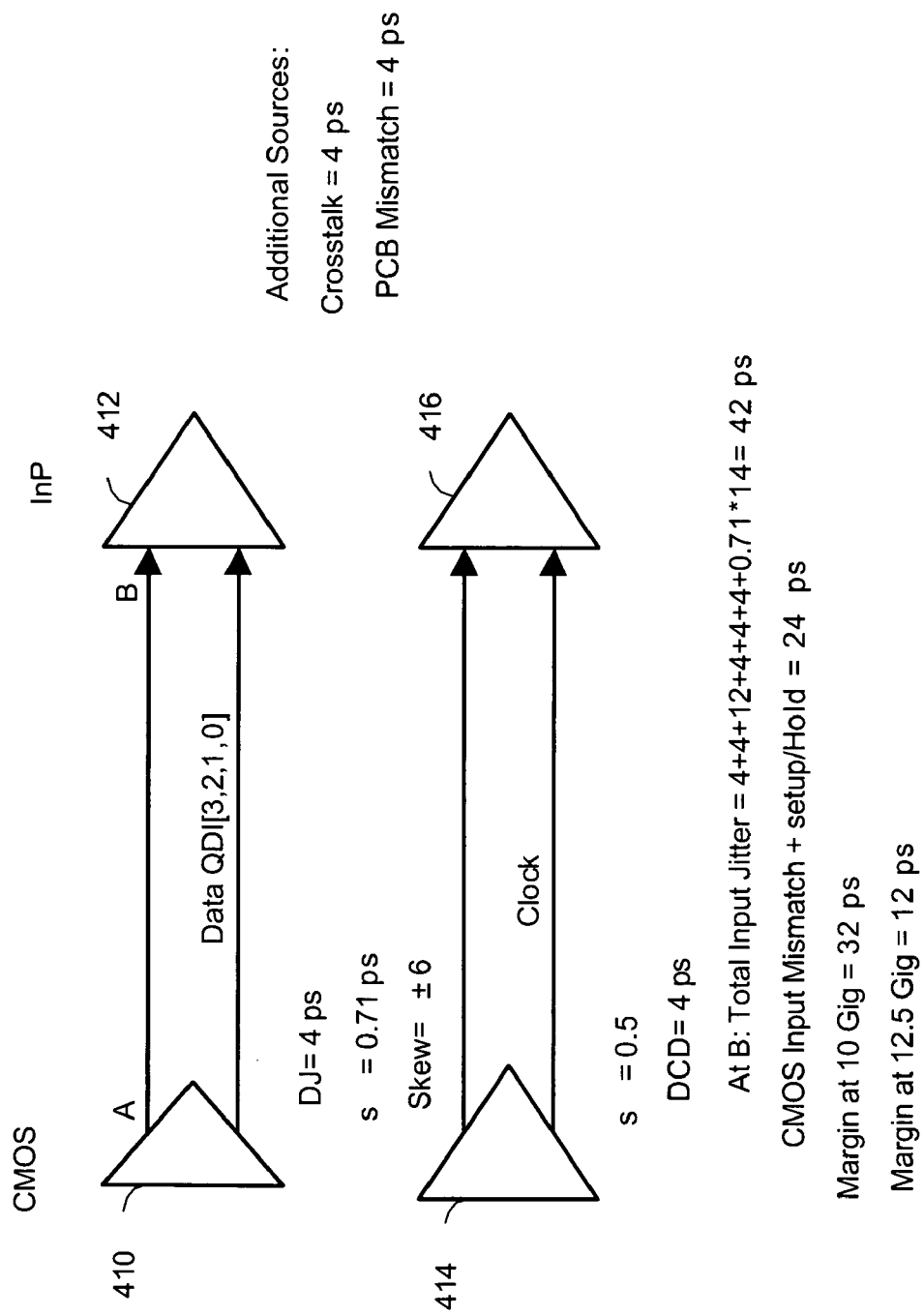
FIG. 7 is a block diagram illustrating the jitter allocation for the RX link between RX data multiplexer circuits of FIG. 3.

FIG. 7 provides a block diagram illustrating the jitter allocation for the RX link between RX data demultiplexer circuits 308 and 306 of FIG. 3. One of four data differential data line drivers 410 of the RX data demultiplexer circuit 308 and a differential clock driver 414 of the RX data demultiplexer circuit 308 on the 4 bit stream 10 GBPS side are shown. FIG. 7 also shows one of four data input buffers 406 of the RX data demultiplexer circuit 306 and a clock input buffer 412 of the RX data demultiplexer circuit 306. As is indicated, deterministic jitter for the data interface is specified as a maximum of 8 picoseconds. Further, the skew or non-deterministic jitter in the data lines is limited to ±8 picoseconds. The additional information provided in FIG. 7 shows how these jitters may be summed to result in maximum jitters.

Figure 8:
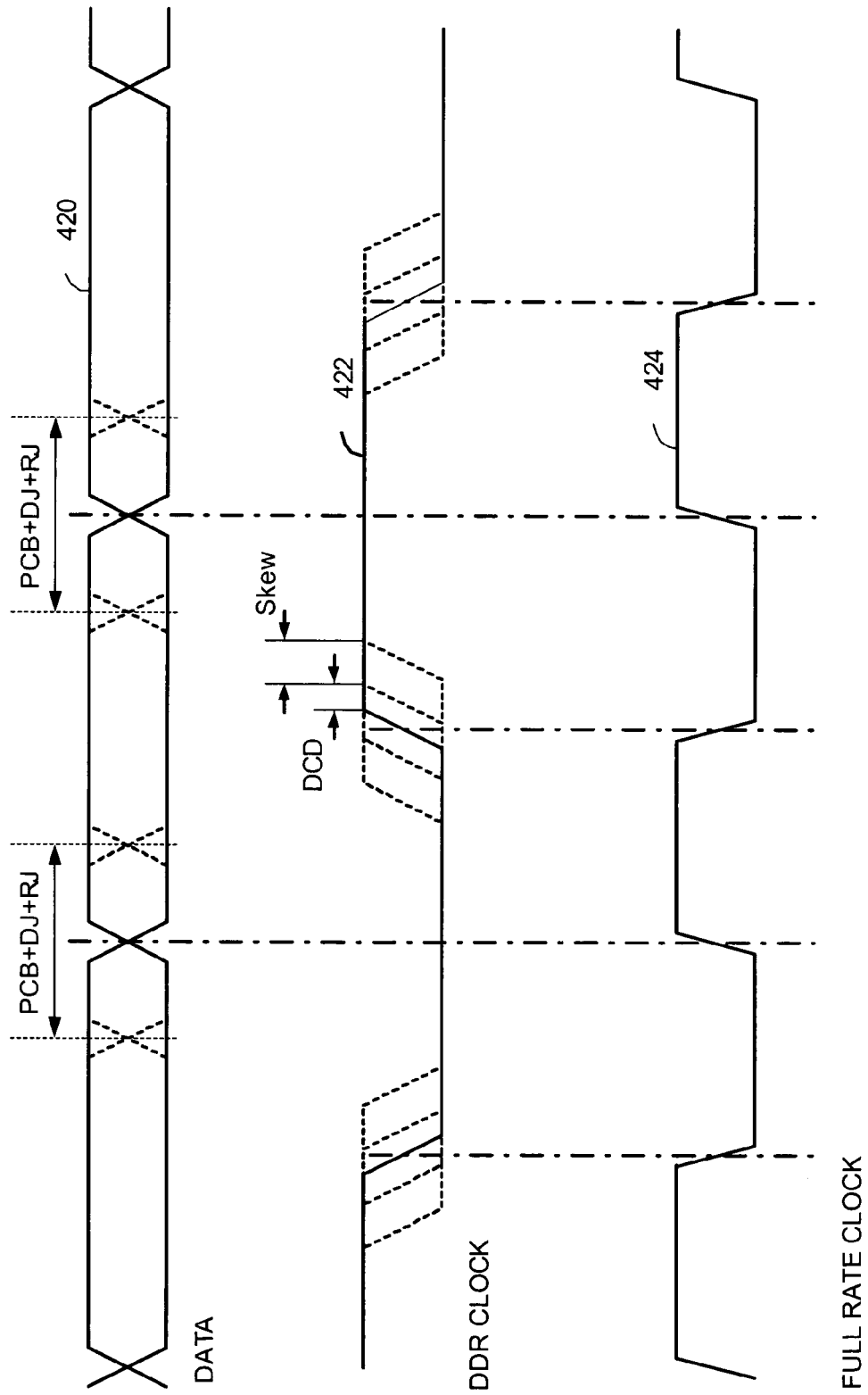
FIG. 8 includes timing diagrams illustrating the set up and hold operations on the 4 bit wide×10 GBPS links between the RX data demultiplexer circuits of FIG. 3.

FIG. 8 provides a timing diagram illustrating the set up and hold operations on the 4 bit×10 GBPS links between the TX data demultiplexer integrated circuits 306 and 308 of FIG. 3. In particular, the diagram illustrates the jitter relationships and definitions of the data 420, the DDR clock 422 and a full rate clock 424. There is little or no room for error regarding clock and data between the clock arriving at the various multiplexers/demultiplexers of the above described data conversion circuits.

Figure 9:
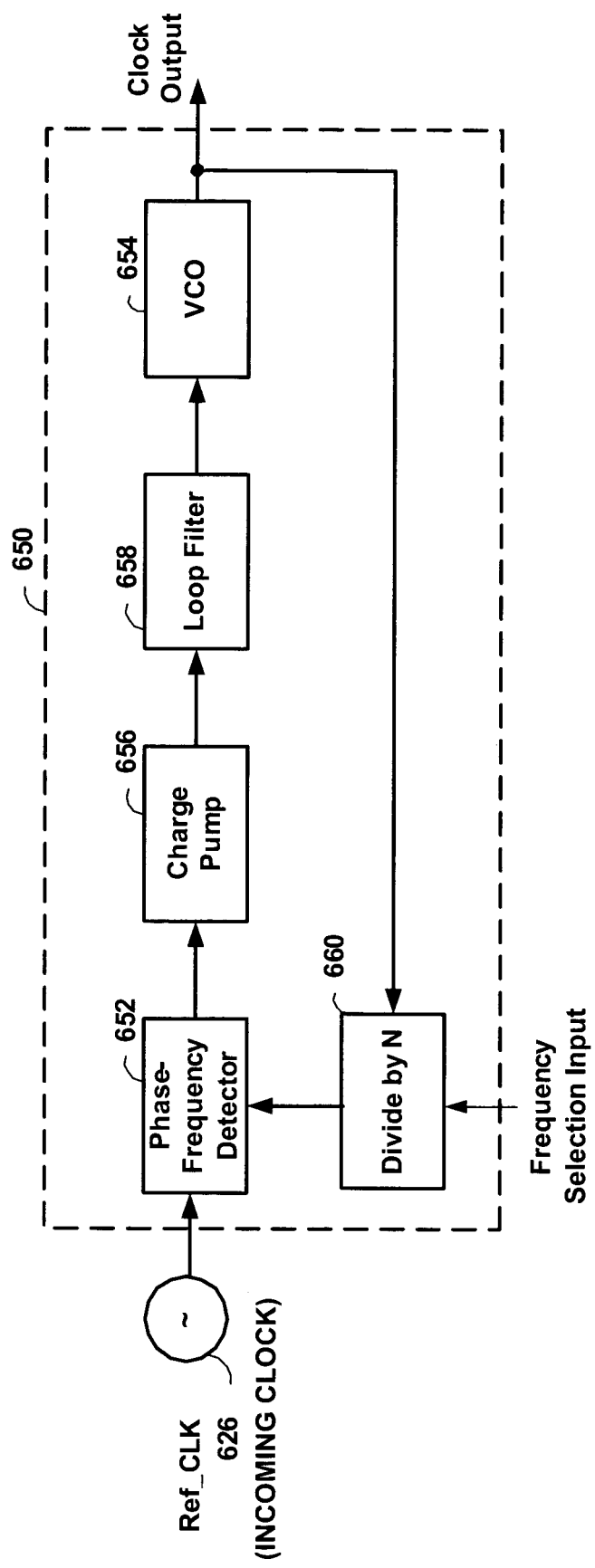
FIG. 9 is a block diagram illustrating an embodiment of a Phase Locked Loop that generates a clock signal and that includes a VCO constructed according one of a number of embodiments of the present invention.

FIG. 9 depicts a VCO incorporated into a PLL within a cock circuit. A PLL forces the phase of the periodic signal at the output of its VCO to be approximately equal to the phase of the input signal. The only way these phases can be equal is for the frequencies of these signals to be equal as well. Therefore, a generic PLL guarantees that the frequency of the VCO is equal to that of its input. The use of a divider circuit allows the VCO frequency to be a multiple of that of the incoming signal. PLL 650 receives an incoming clock signal such as that provided by reference clock 626. Phase detector 652 generates an error that is ideally proportional to the difference in phase between the loop input, INCOMING CLOCK, and the output of VCO 654. Loop filter 658 attenuates rapid variations in the error between the output of VCO 654 and the INCOMING CLOCK, and provides this input to charge pump 656. Divide by N circuit 660 accounts for difference in the VCO output and INCOMING CLOCK frequency.

Figure 10:
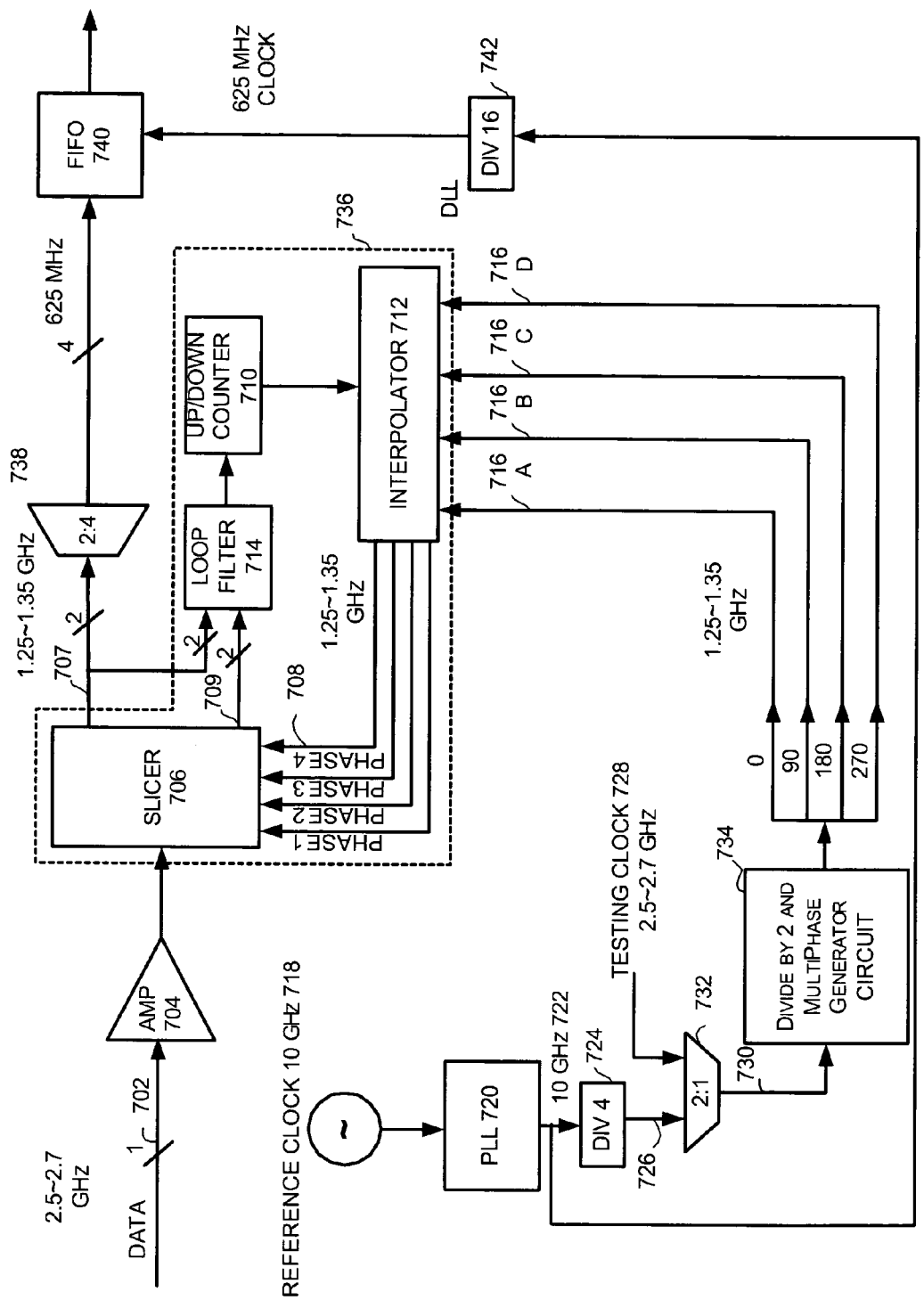
FIG. 10 is a block diagram illustrating a high-speed data circuit of the present invention that recovers a clock signal from a data signal with a predetermined phase relationship.

FIG. 10 illustrates a circuit used to control the clock data phase relationship in a high-speed data conversion circuit. Data signal 702 is received at the data conversion circuit and processed by amplifier 704 prior to being applied to slicer 706. Slicer 706 samples data signal 702 with a clock signal that the slicer helps to recover from the data. Slicer 706 makes up part of the clock recovery loop 736 used to recover a high-speed clock signal having a $1^{st}$ clock rate derived from the data signal. Multiple-phase input clock signals 716A, 716B, 716C and 716D at 0°, 90°, 180° and 270°, respectively are applied to interpolator 712. Interpolator 712 functions in either a normal mode of operation or a testing mode of operation. In the testing mode the $1^{st}$ clock rate and the $2^{nd}$ clock rate differ. This difference is forced by the application of a testing clock signal 728.

Normally, a reference clock signal such as 10 GHz clock signal 718 is applied to PLL 720 to generate the 10 GHz signal 722, which is divided by 4, by module 724 to provide reference clock signal 726 of approximately 2.5-2.7 GHz to multiplexer 732. Testing clock signal 728 is applied to multiplexer 732 in a testing mode of operation. In a normal mode of operation, testing clock signal 728 is not applied to multiplexer 732. In the testing mode of operation, testing clock 728 which differs in frequency from that of reference clock signal 726. For example, in one instance this difference may be plus or minus 200 PPM. Multiplexed signal 730 is applied to Divide by 2 and multi-phase generator circuit 734 to produce the 4 multiple-phase input clock signals for interpolator 712. Divide by 2 and multi-phase generator circuit 734 produces these clock signals at 1.25-1.35 GHz. A DLL within the Divide by 2 and multi-phase generator circuit may be used to produce the 4 multiple-phase input clock signals. Interpolator 712 rotates the phase of the multiple-phase input clock signals 716A-D to produce multiple-phase output clock signals 708 having Phases 1-4 which differ by 90°. The multiple-phase output clock signals 708 are applied to slicer 706. Two of the phases (Phases 1 and 3 at 0° and 180° respectively) are used to sample data and provide a two-bit data signal 707 to multiplexer 738. Phases 2 and 4 also sample data signal 702 and provide two loop filter signals 709. Both data signal 707 and loop filter signals 709 are used within the clock recovery loop. These results are discussed in further detail with reference to FIGS. 11A and 11B. A phase detector within slicer 706 senses a phase difference between the data signal and the multiple-phase output clock signal 708 to generate a feedback signal through loop filter 714 and UP/Down counter 710 interpolator 712 to adjust the multiple-phase output clock signals. The multiple-phase output clock signals 708 cause slicer 706 to sample the data signal 702 at about midway between the data signals 708 transitions.

Figure 11A:
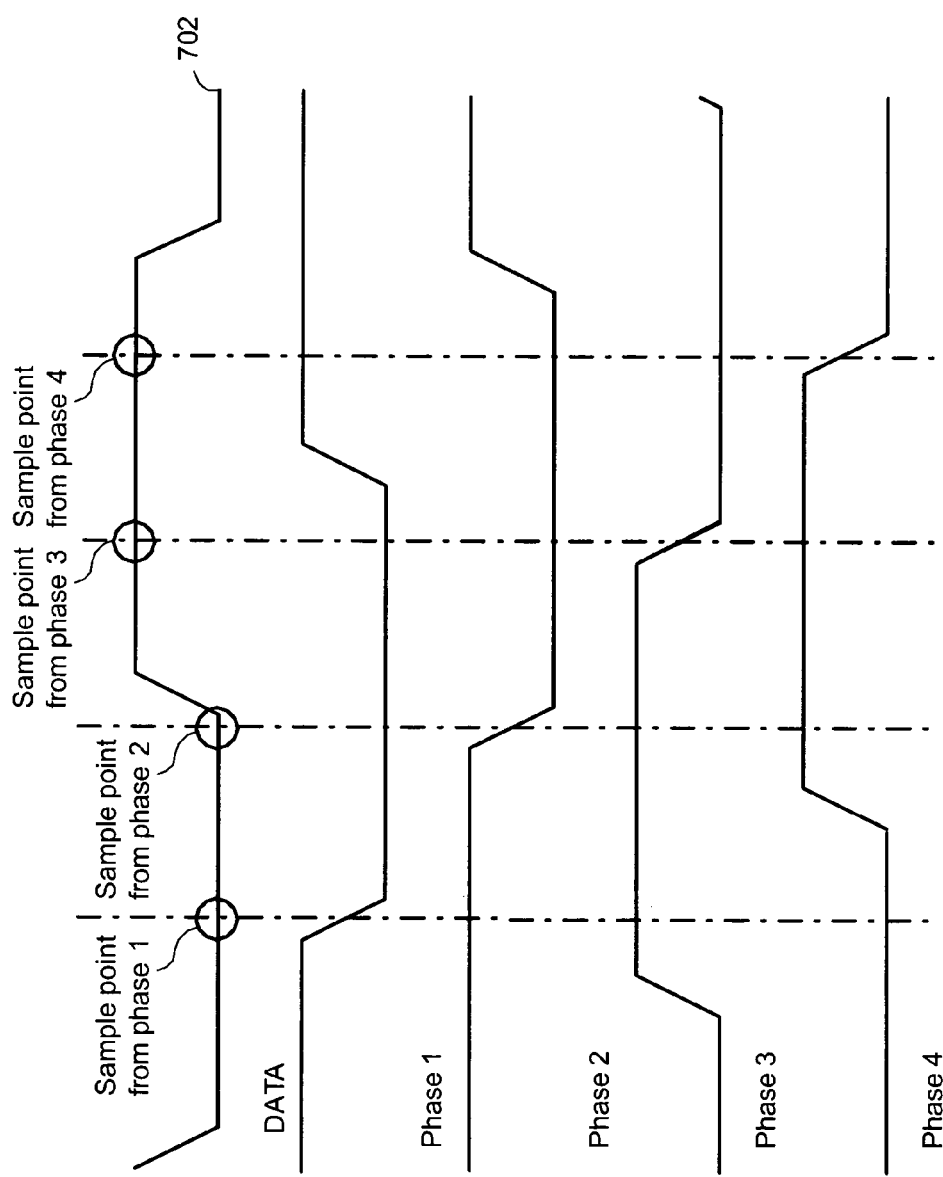
FIGS. 11A and 11B are timing diagrams that depict the alignment of a data signal to signals used to recover a clock signal in accordance with the present invention.

FIG. 11A is a timing diagram that shows that the sampling of data signal 702 with Phase 1 and Phase 2 yields the same results. This is again shown with the sampling of data signal 702 with Phase 3 and Phase 4. Ideally, Phases 2 and 4 sample data signal 702 at a transition point. Therefore, in this instance Phases 2 and 4 are sampling data signal 702 too early. To correct this, the interpolator will rotate the multiple-phase input clock signals to align the multiple-phase output clock signals to the transition points. This will result in a timing diagram depicted in FIG. 11B where the Phase 2 and 4 sample at the transition points. This alignment ensures that Phases 1 and 3 sample at about midway between the transition points. In this embodiment four phases are used for alignment with transitions of the data and that the other two can be used for sampling the data. As shown, Phases 1 and 3 are used for sampling and Phases 2 and 4 are used for alignment with the transitions. The interpolator generates these clock phases in appropriate relation to the data so that sampling will correctly occur.

By comparing the results from applying data signal 702 to slicer 706, one is able to determine how the interpolator should rotate the multiple-phase input clock signals 716A-D in order to recover the proper clock signal to sample data signal 702. Additionally, this method allows the proper operation of interpolator 712 to be verified by forcing interpolator 712 to rotate the multiple-phase input clock signal 716A-D to produce multiple-phase output clock signal 708. This rotation must be forced when the data signal is based on a common reference clock and the interpolator need not rotate its input. When no frequency difference exists between the multiple-phase input clock signals in 716A-D and data signal 702 the interpolator a testing clock must be applied to ensure a frequency difference between the multiple-phase input clocks and the data rate of data signal 702. With this frequency difference, one can verify proper operation of the interpolator.

Referring to both FIG. 11A and FIG. 10, the data that is sampled at Phases 1 and 3, or 0° and 180°, is applied to a demultiplexer 738 which in turn provides 4-625 MHz signals to FIFO buffer 740. FIFO buffer 740 receives a 625 MHz clock derived from reference clock signal 718. Reference clock 718 is processed by PLL 720 to produce 10 GHz clock signal 722. 10 GHz clock signal 722 divided by 16 by circuit 742 to produce 625 MHz clock signal which is then provided with the data output by FIFO buffer 740. The samples at Phases 2 and 4 are applied to the feedback loop and are used for interpolator control.

Figure 11B:
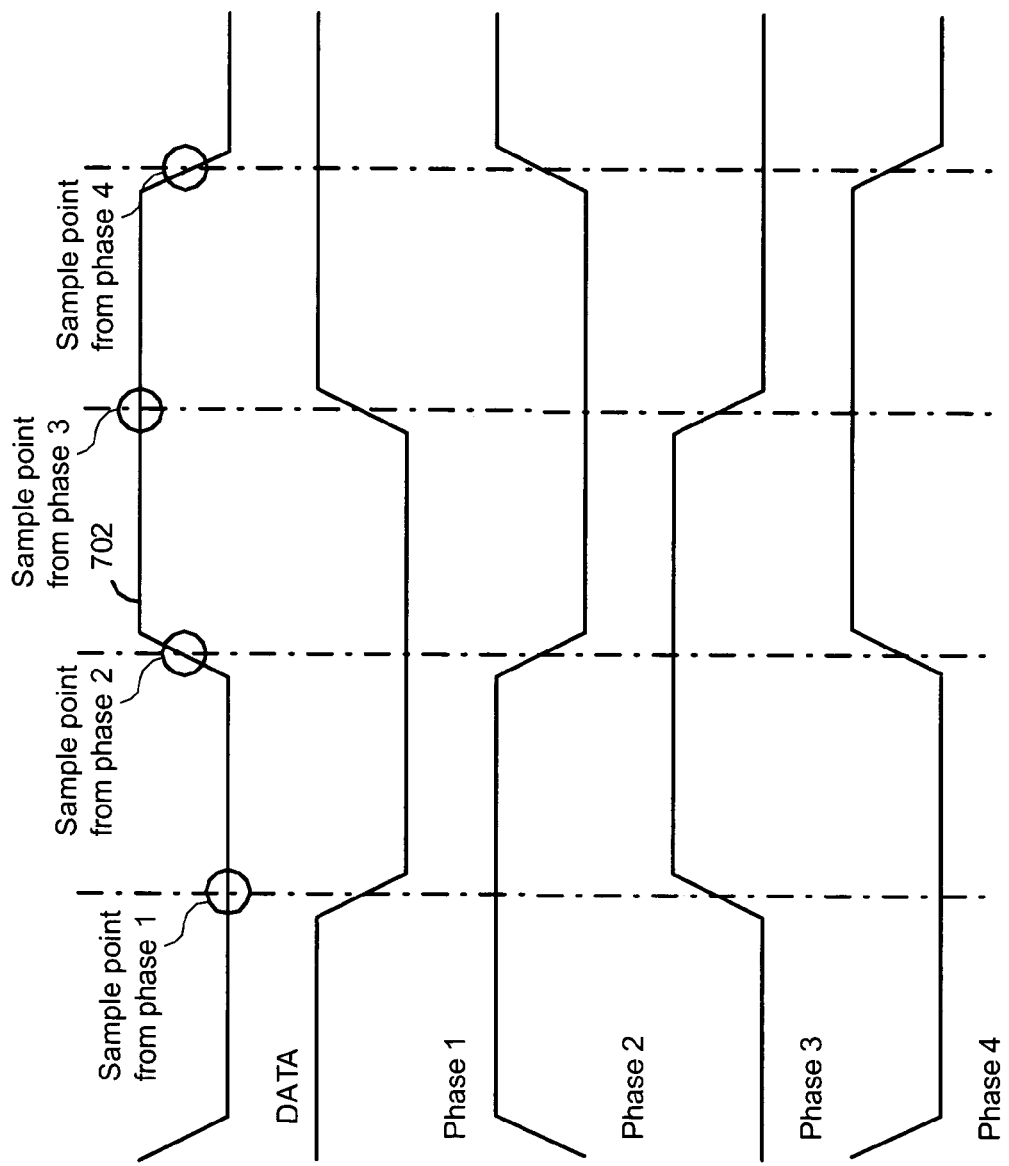

FIG. 11B is a timing diagram that shows that the sampling of data signal 702 with Phase 1 and Phase 2 yields differing results. For the slicer 706 to correctly sample data signal 702, Phases 2 and 4 of multiple-phase input clock signal 708 should align with the transitions of data signal 702 such that Phase 1 and 3 of the multiple-phase input clock signal 708 sample the data signal 702 at the midpoint between transitions. When Phase 2 and 4 are properly aligned, they sample at approximately the transitions. With the particular example of FIGS. 11A and 11B, when there is a transition in data the results of sampling data signal 702 with Phase 1 and Phase 2 should differ. However, during normal operations the data signal 702 typically will not transition each bit time.

The same is true of the results of sampling data signal 702 with Phase 3 and Phase 4. When Phase 2 samples early, the results of sampling data signal 702 may not always differ. This result is then used as a feedback signal to interpolator 712 to force Phase 2 to then sample later so that the results of sampling data signal 702 with Phase 1 and Phase 2 typically differ. The same or equivalent comparisons are made with Phases 3 and 4. These comparisons allow a clock signal to be recovered from the data and ensure that data signal 702 may be properly sampled without requiring the application of a clock signal with that data signal. FIG. 11A clearly shows that the multiple-phase input clocks are not properly aligned with data signal 702. However, FIG. 11B shows that the multiple-phase input clocks are properly aligned with data signal 702.

Figure 12:
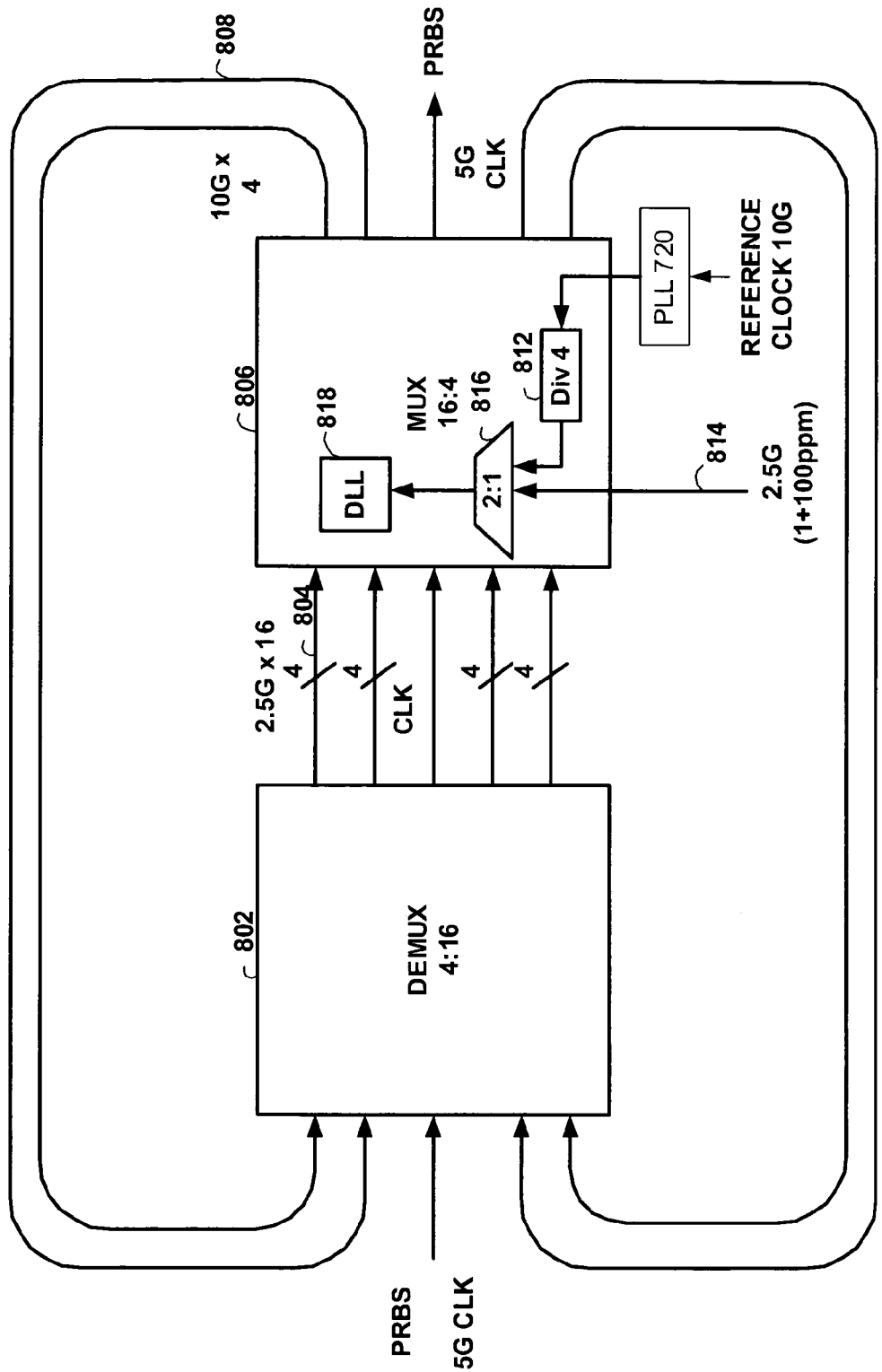
FIG. 12 is a block diagram of a high-speed data circuit, where proper operation of the clock recovery functions are tested in accordance with the present invention.

FIG. 12 illustrates a demultiplexer 802 and multiplexer 806, which are coupled together. Multiplexer 806 provides output 808, which is used as an input to demultiplexer 802. A pseudo random bit stream (PRBS) and 5 G-clock signal are applied to the demultiplexer 802. Demultiplexer 802 is a 4:16 demultiplexer and produces 16-2.5 GHz outputs 804. To ensure proper latching of data by demultiplexer 802 and multiplexer 806 the circuit described in FIG. 10 or its equivalent may be used to recover a clock signal from the data. Here again, the 10 GHz reference clock signal 718 is applied to PLL 720 and then to produce the 10 G clock signal 810 provided as input to divide-by-4 circuit 812. Multiplexer 816 receives the output of divide-by-4 circuit 812 and a 2.5 G clock signal that may differ from that of the output of divide-by-4 circuit 812. For example, 2.5 G megahertz signal 814 may differ by as much as + or −200 PPM when compared to the output of divide-by-4 circuit 812. This clock signal is applied to DLL 818, which is then used to recover the data clock.

Figure 13:
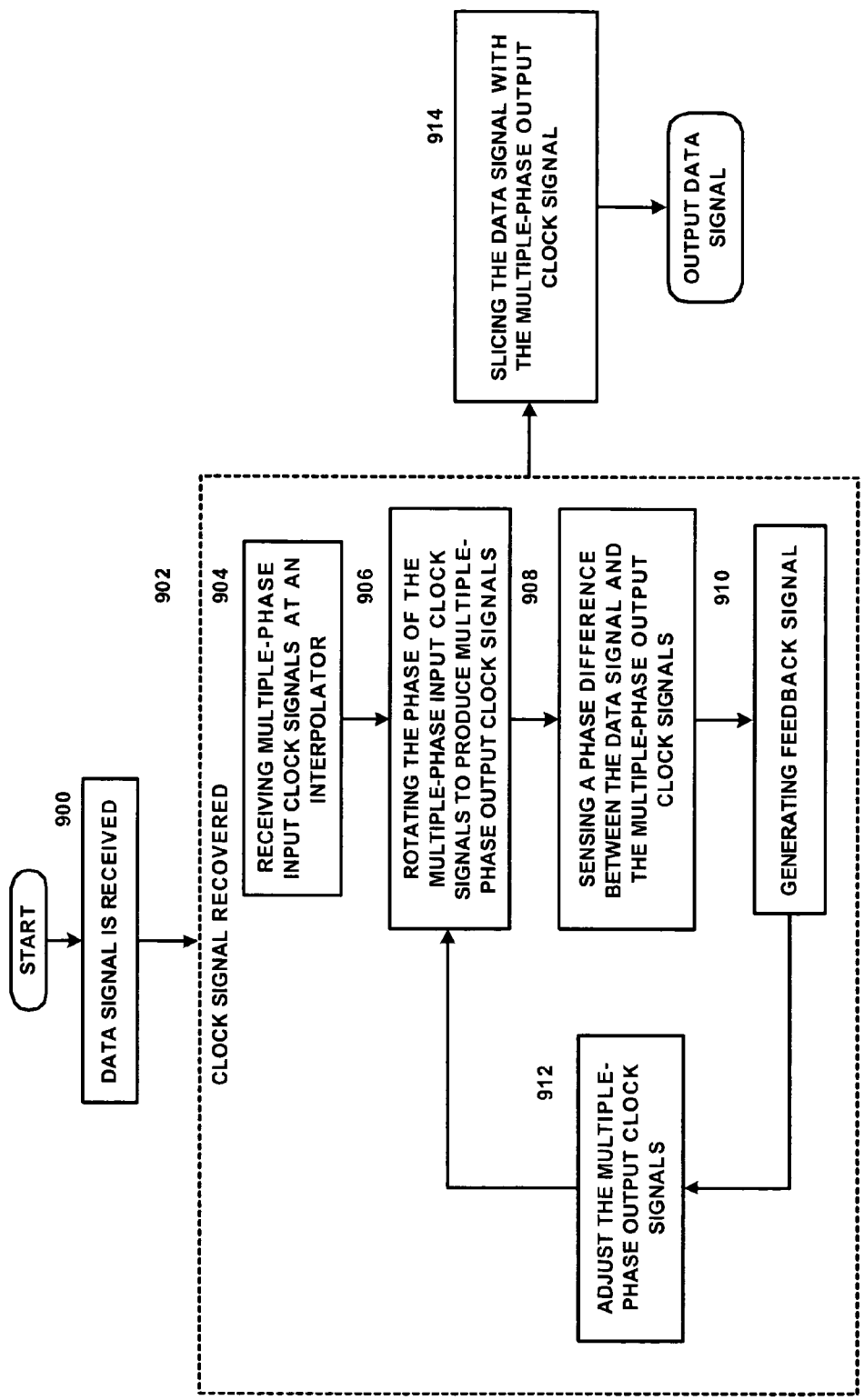
FIG. 13 is a logic flow diagram in accordance with an embodiment of the present invention.

FIG. 13 is a flow chart illustrating the processes associated with this disclosure. At Step 900, a data signal is received. A clock signal is recovered from the data signal at Step 902. Clock recovery involves receiving multiple-phase input clock signals at an interpolator that functions in either a normal mode or a test mode of operation at Step 904. In the test mode, the clock rate of the recovered clock signal is forced to differ from that of the multiple-phase input clock signals to the interpolator. The interpolator rotates the multiple-phase input signals to produce multiple-phase output clock signals at Step 906 which are applied to a slicer at Step 908. The phase difference between the data signal and the multiple-phase output clock signals is sensed and used to generate a feedback signal at Step 910 for the interpolator. This signal is used to adjust or rotate the multiple-phase output clock signals in Step 912. Then at Step 914, the data signal again may be sliced or sampled with the multiple-phase output clock signals at about midway between the crossing points of the multiple-phase output clock signals to produce an output data signal.

In the normal mode of operation, the clock rate of the multiple-phase input clock signals and the data signal do not differ thus, the interpolator does not typically continuously rotate the multiple-phase input clock signals to produce rotating multiple-phase output clock signals. Rather, a mere phase shift may be employed to ensure that the data signal is sliced with the multiple-phase output clock signals at about midway between the crossing points of the multiple-phase output clock signals.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A method of controlling clock-data phase relationship in a high-speed data conversion circuit, comprising the steps of:

receiving a data signal at the data conversion circuit;

recovering a high-speed clock signal having a first clock rate from the data signal;

receiving multiple-phase input clock signals having a second clock rate at an interpolator, wherein the interpolator functions in either a normal mode of operation or a testing mode of operation, wherein in the testing mode of operation the first clock rate and second clock rate differ;

rotating with the interpolator the phase of the multiple-phase input clock signals to produce multiple-phase output clock signals at the second clock rate, wherein the multiple-phase output clock signals input into a slicer;

sensing a phase difference between the data signal and the multiple-phase output clock signals at the slicer, wherein the phase difference generates a feedback signal used by the interpolator to adjust the multiple-phase output clock signals; and slicing the data signal with the multiple-phase output clock signal about midway between crossing points of the multiple-phase output clock signals to produce at least one output data signal.

2. The method of claim 1, wherein the interpolator manipulates the phase difference between the data signal and the multiple-phase output clock signal by rotating individual phases of the multiple-phase input clock signals.

3. The method of claim 1, wherein the interpolator manipulates the phase difference between the data signal and the multiple-phase output clock signal by selectively weighting and summing a plurality of multiple-phase input clock signals having differing phases.

4. The method of claim 3, further comprising the steps of:

dividing down a reference clock signal at a reference frequency to produce a reduced frequency clock signal;

multiplexing the reduced frequency clock signal with a testing clock signal to produce a multiplexed reduced frequency clockltesting clock signal; and differentially dividing the multiplexed reduced frequency clockltesting clock signal to produce the multiple-phase input clock signals.

5. The method of claim 1, wherein a loop filter attenuates rapid variations in the phase difference between the data signal and the multiple-phase output clock signal.

6. The method of claim 1, further comprising the steps of:

demultiplexing the output data signal of the slicer to produce a plurality of reduced data rate signals; and aligning the plurality of reduced data rate signals to a second reduced frequency clock signal with an elastic FIFO buffer.

7. The method of claim 1, wherein a testing clock signal, being at a frequency different from the reduced frequency clock signal, forces functions of the interpolator to be exercised.

8. A method of testing for proper operation an interpolator used within a data conversion circuit to align a clock signal to a data signal, comprising the steps of receiving a data signal at the data conversion circuit;

recovering a high-speed clock signal having a first clock rate from the data signal;

generating multiple-phase input clock signals having a second clock rate as inputs to the interpolator, wherein in a normal mode of operation the multiple-phase input clock signals are derived from a reference clock, and wherein in a testing mode of operation a testing clock combines with the reference clock to produce the multiple-phase input clock signals and wherein the second clock rate and first clock rate differ in the testing mode of operation;

rotating with the interpolator the phase of the multiple-phase input clock signals to produce multiple-phase output clock signals at the second clock rate, wherein the multiple-phase output clock signals input into a slicer; and sensing a phase difference between the data signal and the multiple-phase output clock signals at the slicer, wherein the phase difference generates a feedback signal used by the interpolator to adjust the multiple-phase output clock signals, such that the data signal may be sampled with the multiple-phase output clock signal at about midway between crossing points of the multiple-phase output clock signals.

9. The method of claim 8, wherein the interpolator manipulates the phase difference between the data signal and the multiple-phase output clock signal by rotating individual phases of the multiple-phase input clock signals.

10. The method of claim 8, wherein the interpolator manipulates the phase difference between the data signal and the multiple-phase output clock signal by selectively weighting and summing a plurality of input clock signals having differing phases.

11. The method of claim 8, wherein a loop filter attenuates rapid variations in the phase difference between the data signal and the multiple-phase output clock signal.

12. The method of claim 8, further comprising the steps of:

dividing down a reference clock signal at a reference frequency to produce a reduced frequency clock signal;

multiplexing the reduced frequency clock signal with a testing clock signal to produce a multiplexed reduced frequency clockltesting clock signal; and differentially dividing the multiplexed reduced frequency clock/testing clock signal to produce the multiple-phase input clock signals.

13. A high-speed data conversion circuit, that controls a clock-data phase relationship, comprising:

a slicer to receive a data signal having a data rate and that slices the data signal to produce an output data signal wherein the slicer further comprises a phase detector to determine a phase difference between the data signal and multiple-phase output clock signals to produce a phase difference signal;

an up/down counter to receive the phase difference signal from the slicer;

an interpolator to receive an output from the up/down counter, to rotate multiple-phase input clock signals to produce the multiple-phase output clock signals based on the output from the up/down counter, and that to supply the multiple-phase output clock signals; and wherein the interpolator rotates individual phases of the multiple-phase input clock signals to establish a predetermined phase difference between the data signal and the multiple-phase output clock signals.

14. The high-speed data conversion circuit of claim 13, wherein the predetermined phase difference aligns a sample point on the data signal to about midway between crossing points of at least one phase of the multiple-phase output clock signals.

15. The high-speed data conversion circuit of claim 13, wherein the interpolator manipulates the phase difference between the data signal and the multiple-phase output clock signals by rotating individual phases of the multiple-phase input clock signals.

16. The high-speed data conversion circuit of claim 13, wherein the interpolator manipulates the phase difference between the data signal and the multiple-phase output clock signals by selectively weighting and summing the multiple-phase input clock signals.

17. The high-speed data conversion circuit of claim 13, further comprising a loop filter to attenuate rapid variations in the phase difference between the data signal and the multiple-phase output clock signals.

18. The high-speed data conversion circuit of claim 13, further comprising:

a reference clock signal to produce a reference frequency;

a first divider circuit to divide the reference clock signal to produce a reduced frequency clock signal;

a 2:1 multiplexer to multiplex the reduced frequency clock signal with a testing clock signal; and a differential divider to divide a multiplexed reduced frequency clock/testing clock signal outputted from the 2:1 multiplexer to produce multiple-phase input clock signals.

19. The high-speed data conversion circuit of claim 18, further comprising:
a 2:4 demultiplexer that-isepefable to demultiplex the output data signal of the slicer, and to produce reduced data rate signals; and an elastic FIFO buffer to align the reduced data rate signals to a reduced frequency clock signal derived from the reference clock signal.

20. The high-speed data conversion circuit of claim 18, wherein the testing clock signal, being at a frequency different from the reduced frequency clock signal forces the interpolator's functions to be exercised.

* * * * *

UNITED STATES PATENT AND TRADEMARK OFFICE
CERTIFICATE OF CORRECTION

PATENT NO. : 7,289,543 B2  Page 1 of 1
APPLICATION NO. : 10/778419
DATED : October 30, 2007
INVENTOR(S) : Guangming Yin It is certified that error appears in the above-identified patent and that said Letters Patent is hereby corrected as shown below:

Column 11, line 22, in Claim 4: replace "clock1testing" with --clock/testing--

Column 11, line 24, in Claim 4: replace "clock1testing" with --clock/testing--

Column 12, line 18, in Claim 12: replace "clock1testing" with --clock/testing--

Column 13, line 7, in Claim 9: remove "that-iseptable"

Signed and Sealed this

Twelfth Day of August, 2008

JON W. DUDAS
*Director of the United States Patent and Trademark Office*